United States Patent [19]

Lumelsky et al.

[11] Patent Number: 5,119,082
[45] Date of Patent: Jun. 2, 1992

[54] COLOR TELEVISION WINDOW EXPANSION AND OVERSCAN CORRECTION FOR HIGH-RESOLUTION RASTER GRAPHICS DISPLAYS

[75] Inventors: Leon Lumelsky, Stamford, Conn.; Sung Min Choi, White Plains; Alan W. Peevers, Peekskill, both of N.Y.

[73] Assignee: International Business Machines Corporation, Armonk, N.Y.

[21] Appl. No.: 415,012

[22] Filed: Sep. 29, 1989

[51] Int. Cl.⁵ .................. G09G 1/06; H04N 9/74; H04N 7/01
[52] U.S. Cl. .................. 340/731; 340/703; 340/814; 358/22; 358/140
[58] Field of Search .................. 340/717, 814, 731; 358/22, 140

[56] References Cited

U.S. PATENT DOCUMENTS

| | | | |
|---|---|---|---|
| 4,063,280 | 12/1977 | Hattorie et al. | 358/22 PIP |
| 4,121,283 | 10/1978 | Walker | 340/703 |
| 4,134,128 | 1/1979 | Hurst | 358/160 |
| 4,303,986 | 12/1981 | Lans . | |
| 4,317,114 | 2/1982 | Walker . | |
| 4,686,580 | 8/1987 | Kato et al. | 358/451 |
| 4,746,979 | 5/1988 | Kashigi | 358/22 |
| 4,746,981 | 5/1988 | Nadan et al. | 340/717 |
| 4,821,031 | 4/1989 | Roberts | 340/731 |
| 4,952,923 | 8/1990 | Tamura | 340/731 |

OTHER PUBLICATIONS

"Digital Image Processing", by Gregory A. Baxes, pp. 160–161, 1984.
Philips Co. SIGNETICS; Digital Video Signal Processing—Part One.

*Primary Examiner*—Alvin E. Oberley
*Assistant Examiner*—Amare Mengistu
*Attorney, Agent, or Firm*—Roy R. Schlemmer; Jack M. Arnold

[57] ABSTRACT

A video pixel presentation rate expansion circuit is provided for use with a high-resolution display system. The overall display system includes a high-resolution monitor, a computer for providing control signals, including a high-resolution frame buffer for storing computer graphics and TV video images and reading out said video data at a rate controlled by said control signals and providing said data with a high-resolution monitor for display. The expansion circuit of the present invention comprises means responsive to an expansion pattern generated by the computer for changing the time base of the video pixel data read out of said frame buffer. Circuit includes means responsive to said expansion pattern for selectively repeating predetermined scan lines of said video display and for selectively repeating certain pixel along a given scan line to match the time base of the video data read out of said frame buffer to the time base of said high-resolution monitor. According to a preferred embodiment of the invention the expansion circuit functions to modify the control signals which controls the read-out of the frame buffer in a predetermined fashion without any additional video buffer storage means.

5 Claims, 5 Drawing Sheets

FIG.4A
PRIOR ART

| Y | A | B | C | D | E | F | G | H | I |
|---|---|---|---|---|---|---|---|---|---|
| (B-Y) | A | B | C | D | E | F | G | H | I |
| (R-Y) | A | B | C | D | E | F | G | H | I |

FIG.4B

| Y | A | A | B | C | C | D | E | E | F | F | G | H | I |
|---|---|---|---|---|---|---|---|---|---|---|---|---|---|
| (B-Y) | A | B | C | D | A | B | C | D | E | F | G | H | I |
| (R-Y) | A | B | C | D | A | B | C | D | E | F | G | H | I |

COLOR TELEVISION WINDOW EXPANSION AND OVERSCAN CORRECTION FOR HIGH-RESOLUTION RASTER GRAPHICS DISPLAYS

FIELD OF THE INVENTION

The present invention relates generally to the field of raster-scan graphic/video display systems. More particularly, it relates to such display systems which are capable of displaying interchangeably and/or concurrently both high-resolution graphic data and standard lower resolution TV video data on a high-resolution graphics monitor.

CROSS REFERENCE TO RELATED APPLICATIONS

U.S. patent application Ser. No. 314,998, filed Feb. 24, 1989 of Lumelsky et al., Entitled "Color-Television Window For a Video Display Unit" discloses a video adapter architecture which provides for the expansion of video data before it is stored in the video frame buffer. It performs the requisite time-base or pixel presentation rate expansion on the data at the input to the video frame buffer and requires significant extra hardware to perform this operation contrasted with the present invention.

BACKGROUND OF THE INVENTION

The mapping of a television image on a graphics screen generally requires the image to be sampled and stored into a frame buffer. This allows a time base correction to be provided and, if necessary, a time compression of the television image in order to show both television and graphics images on the same screen. If the image should be positioned in any arbitrary sized window on a graphics screen, it should be either scaled up or down. The image itself may not be a full screen image, but just an arbitrary window inside the full view image. This requires a translation and scaling operation on the source image. Translation is a simple matter, and shall not be discussed in this paper. FIG. 1 shows how a TV image window, Is, is transposed to a graphics screen window, Id.

Scaling up a television image on a graphics screen poses a much harder problem than scaling down. When scaling down a source image to a smaller destination image, it is possible to simply ignore pixels in the horizontal direction and ignore scan lines in the vertical direction to achieve the correct sizing at the time of sampling. For example, to achieve a quarter sized window, every other pixel can be thrown away horizontally, and every other scan line vertically. This can be done simply at the time of sampling the source image into a frame buffer. However, for image expansion, it is necessary to either replicate pixels in a horizontal direction or replicate scan lines in a vertical direction to achieve the desired destination window size. This poses a problem as the bandwidth of the frame buffer needs to be increased. For example, if it were necessary to double the source image in both horizontal and vertical directions, the bandwidth of the frame buffer required to achieve the expansion needs to be quadrupled. The result of this is that either a faster frame buffer memory is necessary (notice that the speed of the frame buffer depends on the enlarging ratio), a FIFO deep enough to store away incoming pixels such that they are not lost, or a mixture of both.

It should be noted that as the magnification ratio increases, the image quality decreases. For example, when the magnification ratio is greater than two, the sharpness of the image is greatly reduced.

Nevertheless, for current mixed video/graphics display systems, the significance of magnifying television images are of considerable importance. It is especially important due to overscan problems which will be discussed below.

In conventional commercial TV systems, the active portion of the raster (i.e., between blank signals) overscans the viewing area of the CRT to prevent a black border under worst-case conditions of variations in yoke sensitivity, anode voltage, etc. (See "Television Engineering Handbook", McGraw Hill Company, 1986, p.13.177). The overscan requirement for consumer TV receivers goes somewhat higher than 10% of the full active area (See FIG. 2). This means that less than 90% of the active video image is usually shown on a TV screen. It is safe to say that video is overscanned not more than 15%. This number is taken into consideration when video is edited.

On the other hand, high-resolution graphics monitors do not use an overscan approach. Rather, they are underscanned in order to present all graphics image pixels on the screen. In other words, it means that a black border always surrounds the image.

The majority of applications in the multimedia area overlay a television image with graphics. The most widely used approach is to match 85% (in both linear directions) of the active television video with full lengths of the active graphics video line. With this approach a multimedia editor can be sure that whatever television movies or other materials are combined with graphics, the television image coordinates will correspond to the graphics image coordinates with reasonable accuracy, and no unnecessary information, which might be overlooked during editing, will appear on the screen.

The overscan requirement is also important for providing compatibility with previously developed multimedia programs. For example, millions of dollars are spent on such video processing programs such as IBM Infowindow, educational and presentation programs, where the overscan is taken into consideration. For a detailed description of the Infowindow product, reference should be made to one of the following publications describing same.

1) "Infowindow Guide to Operations" Order No. SK2T0297 and,
2) "Infowindow Enhanced Graphics Adapter: Hardware Maintenance and Service Manual" Order No. SK2T0298, both are available from IBM Corp. Mechanicsburg, Pa. Any multimedia display adapter which does not address the overscan problem can not be used with Infowindow or Infowindow-like programs. Moreover, such an adapter can not be used with the television material edited first on standard television editing equipment.

In the case of the IBM Infowindow product, a special enhanced graphics adapter (EGA) monitor is used which provides for the overscan of video. It is, however, not a common graphics monitor. The approach of the present invention allows the use of a standard graphics monitor, providing the television image overscan by a special sampling approach. Such a monitor architecture is disclosed and described in the publication "IBM Infowindow Color Display" No. ZR23-6820 available from the IBM Corp. Mechanicsburg, Pa.

One possible solution to achieving overscan is to choose a television image sampling frequency higher than that of the graphics video clock frequency. E.g., if IBM PS/2 VGA has a video clock frequency of 25 Mhz which corresponds to 640 pixels on the active portion of horizontal scan line, the video sampling frequency should provide 640 pixels on the active portion of the underscanned television horizontal scan line. Therefore, a total of 752 samples are required per scan line to achieve 640 pixels of underscanned samples (e.g., 7524859). Hence, 640 pixels of the sampled video image will correspond to 640 graphics pixels exactly, and the overscan requirement is satisfied.

This approach, however, does not work well when using the standard digital television sampling frequency. Frequently, the television image is decoded and sampled using standard digital television techniques. It provides a cheaper solution, better image quality, and easier control over the brightness, sharpness, hue, etc. Unfortunately, the CCIR 601-1 recommendation for digital television encoding and transmission (See "Handbook of Recommended Standards and Procedures, International Teleproduction Society", 1987, p. 62), which is widely used in the television industry, prescribes a sampling frequency of 13.5 Mhz. It gives a total of only 720 samples on a television scan line. With 15% overscan, it allows only 612 pixels as shown on FIG. 2. The present invention comprises a system for mapping 612 samples of the television image (pixels) onto a larger number of graphics pixels.

Clearly, the solution which preserves the sampling rate is to increase the number of samples after sampling has been done. Using the standard sampling rate of 13.5 Mhz, if the number of graphics pixels is 640, then the expansion ratio should be 640/604. However, this number is not a power of two, and the expansion can not be done in a simple way, like replicating every pixel. Another consideration is that if the graphics adapter has several modes with a different number of pixels in the horizontal line, e.g., 320, 640, 720 pixels in the case of a VGA graphics adapter, (See, for example, IBM PS/2 Model 80 Technical Reference #68X2256 available from the IBM Corp. Mechanicsburg, Pa.) the scaling ratio should be programmable. In a window environment, the expansion ratio should ideally be selectable to be any rational number defined by the size of the window.

This situation is even more complicated by the specific coding scheme of digital television. The standard television coding schemes, either NTSC, PAL, or SECAM are all based on luminance/chrominance (Y/C) representations, rather than RGB, which reduces the bandwidth of the composite video signal and memory required to store the image frame. Furthermore, some digital television chips already in production use a time multiplexing technique to reduce the bandwidth required for chrominance information. For example, Philips provides digital television chips (See, for example, "Digital Video Signal Processing" *Philips Components Manual No.* 9398 063 30011) in which luminance bit rate versus color bit rate is 4:1. Compared to 8 bits of luminance information per sampling clock, only 4 bits of chrominance are generated (2 bits for B-Y and 8 bits of R-Y) as shown in FIG. 3. Thus it takes four clock cycles to transmit a complete chrominance values (8 bits of B-Y and 8 bits of R-Y). This further complicates expansion in the horizontal direction since due to the time multiplexing, it is not possible to simply replicate pixels. Notice that for chrominance, the smallest horizontal resolution is 4 pixels wide. It is necessary to keep the synchronization of the chrominance bits over a period of four system clock cycles, and failing to do so will result in corrupt color on the destination screen for all pixels that are out of synchronization.

Prior Art

No video adapter architectures or hardware systems are known to the inventors which solve the above described problems using methods or apparatus at all similar to the herein disclosed expansion hardware mechanism.

SUMMARY AND OBJECTS

It is a primary object of the present invention to provide a cost effective method and apparatus for expanding video image data stored in a frame buffer in digital format in both the X and Y directions.

It is a further object of the invention to provide such method and apparatus that operates strictly on the frame buffer output and provides certain control signals to the output of the frame buffer for replicating predetermined scan lines and pixels but does not require any additional video buffering hardware.

It is another object of the invention to provide such a method and apparatus wherein the only change in the video data path between the frame buffer and the monitor is the provision of modified clocks for accessing both individual scan lines and pixels from the frame buffer wherein certain scan lines and pixels may be selectively repeated.

Other objects features and advantages of the invention will be apparent from the following description of the invention as set forth in the appended specification, drawings and claims.

The objects of the present invention are accomplished in general by a video expansion circuit for use with a high-resolution display system. The overall display system includes a high-resolution monitor, a computer for providing control signals, a high-resolution frame buffer for storing computer graphics data and a video frame buffer for storing TV video data and a mechanism for reading out the video data at a rate controlled by said control signals and providing the video data to the high-resolution monitor for display.

The expansion circuit of the present invention comprises a mechanism responsive to an expansion pattern generated by the computer for changing the rate of video pixel data read out of the frame buffer. The circuit includes such a mechanism responsive to the expansion pattern for selectively repeating predetermined scan lines of the video display and for selectively repeating certain pixels along a given scan line to allow the video data read out of the frame buffer to be expanded on the high-resolution monitor.

According to a preferred embodiment of the invention the expansion circuit functions to modify the control signals which control the read-out of the frame buffer in a predetermined manner without any additional video buffer storage. In the simplest form of the invention the additional circuitry required comprises only two registers for holding the generated expansion patterns in the horizontal and vertical direction and two shift registers for receiving these patterns and processing same to alter the frame buffer clocks to achieve replication of predetermined lines and pixels as determined from the said expansion patterns.

BRIEF DESCRIPTION OF THE DRAWINGS

FIG. 2 B comprises a graphical representation illustrating the presentation of high-resolution video/graphics data on a high-resolution screen.

FIG. 4 A comprises a diagram similar to FIG. 3 B illustrating consecutive pixels of luminance and chrominance data of a digital TV video signal as it would be conventionally stored in a video frame buffer utilizing the time multiplex technique.

FIG. 4 B is a diagrammatic illustration of the resulting digital TV data illustrating a 2:3 expansion the video data illustrated in FIG. 4 A showing how certain luminance groups are repeated while at the same time conserving the original format for the chrominance data.

DESCRIPTION OF THE DISCLOSED EMBODIMENT

The basic concept of the present invention comprises scaling up the image at the frame buffer output instead of at the frame buffer input. Expansion in the vertical direction is a simple matter since it is possible to display the same scan line multiple times. This can be implemented very cheaply by disabling the vertical display scan line counter from incrementing whenever it is necessary to repeat a scan line.

Expansion in a horizontal direction is not as simple, however. Due to the chrominance, time-multiplexing technique utilized in such digital TV systems, it is not possible to simply replicate the pixels since that will corrupt the phase of the chrominance packets, producing erroneous colors. The necessary chrominance packets are shown in FIG. 4 A. As will be noted the chrominance packet which accompanies a particular replicated pixel does not necessarily correspond to the original chrominance packet as illustrated in FIG. 4 B.

To guarantee that the color does not get corrupted, it is necessary to disable the D/A chip for a clock cycle of the time of the replication to keep the D/A chip in step with the frame buffer. Normally a video D/A chip set does not have this capability built into it. However, it is possible to achieve this effect by controlling the system clock to the D/A chip as explained below.

Although implementation of the present invention may be accomplished in many different ways, e.g., by a counter, a shift register, or a random access memory, all operating under control of the desired expansion pattern a shift register is utilized herein because of its simplicity and cost factors.

Figure 7:
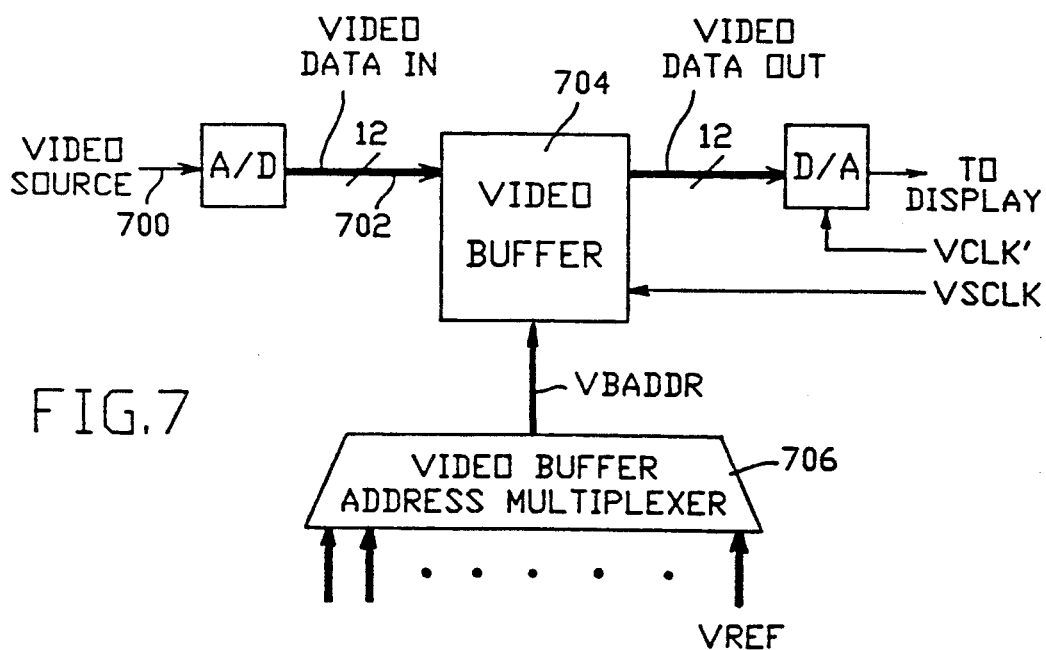
FIG. 7 comprises a high level functional block diagram illustrating the video data flow within such a video buffer system in which the present invention has particular application.

For the vertical direction, the hardware required is quite simple. (See the block diagram of FIG. 5.) Referring briefly to FIG. 7 video data flow in a typical video adapter for a high-resolution display is shown. The analog VIDEO SOURCE 700 is digitally converted into 12 bit data pixels of Y/C representation with the chrominance time multiplexing technique illustrated in FIG. 4 B. This video data passes over (VIDEO DATA IN) line 702 and is stored in the VIDEO BUFFER 704.

Digitized video pixels (VIDEO DATA OUT) are serially scanned out of the VIDEO BUFFER 704 with the VIDEO Scan Clock (VSCLK). When VSCLK is inhibited, the same pixel is repeated for as long as it is inhibited.

VIDEO DATA OUT is converted to analog signal via D/A using VCLK'.

The Video Buffer Address (VBADDR) which controls access to successive lines of data in the VIDEO BUFFER is done with a multiplexer 706 and one of the inputs to this multiplexer is VREF. It will be noted that VREF', VCLK', and VSCLK are generated by the circuitry shown on FIG. 5.

Figure 1:
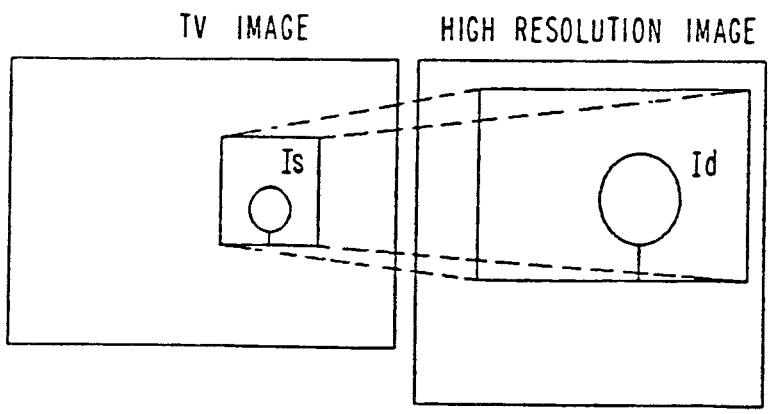
FIG. 1 is a diagramatic representation of the mapping of the window portion of a television window onto a larger high-resolution graphics display screen window.
Figure 2A:
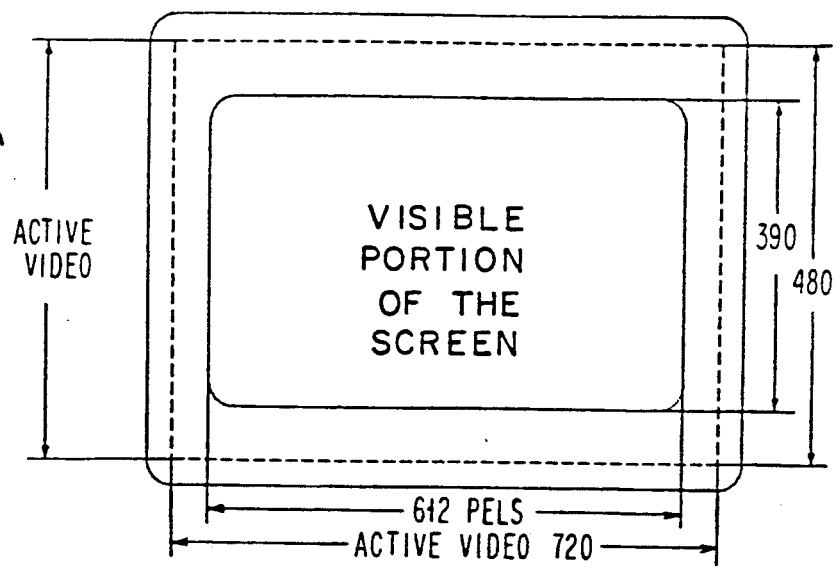
FIG. 2 A is a graphical representation illustrating relationship of the total active video data sent to a standard TV receiver with respect to the actual video data presented on e.g., visible on the TV screen.
Figure 2B:
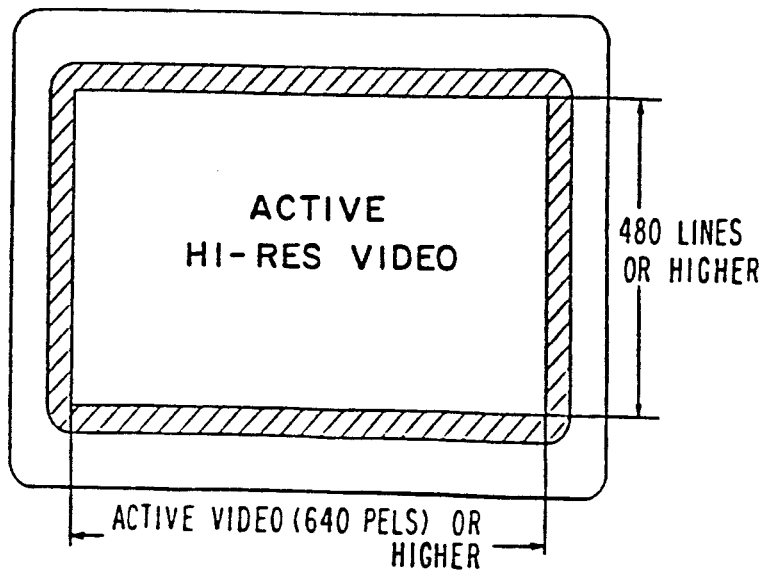
Figures 3A, 3B:
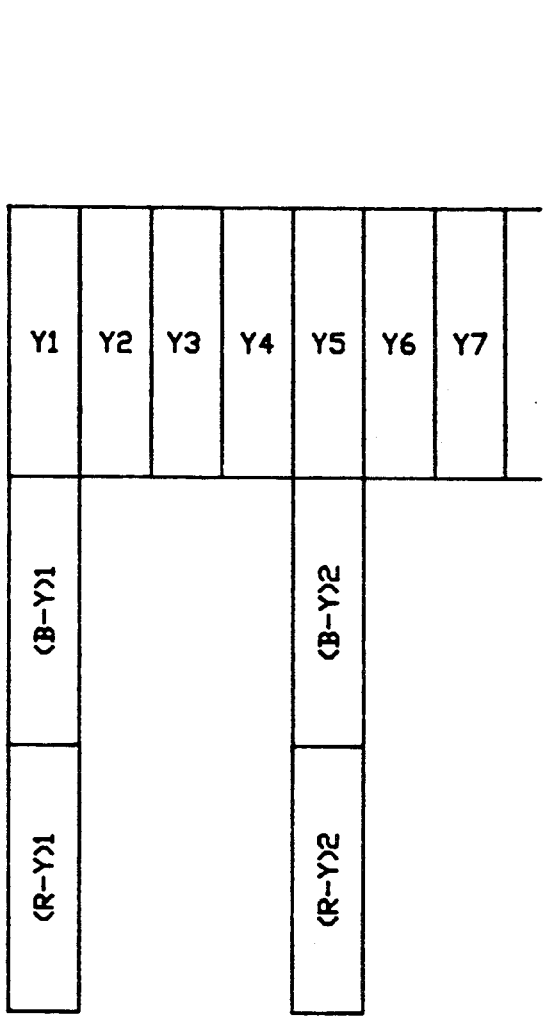
FIGS. 3 A and 3 B are a diagrammatic representation of one prior-art digital-television technique for representing a color television signal, wherein FIG. 3 A illustrates the representation of the actual luminance and chrominance data and wherein FIG. 3 B illustrates the way in which the chrominance data is encoded and combined with the luminance data for transmission and/or storage to conserve bandwidth.
Figure 5:
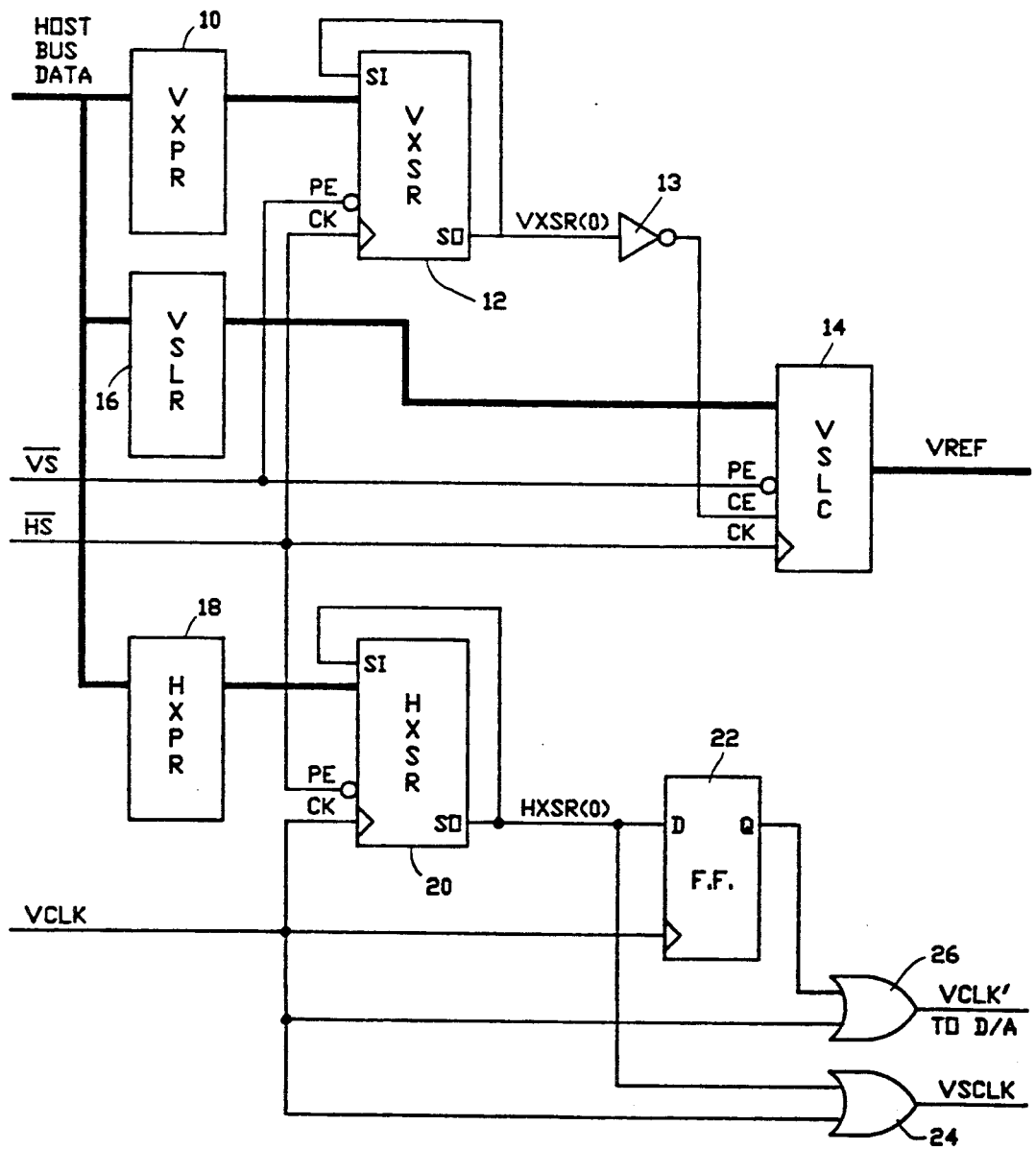
FIG. 5 comprises a functional block diagram of herein disclosed preferred embodiment of the expansion circuit of the present invention.

Before proceeding with a description of FIG. 5; the following terms should be defined:

The Vertical Synchronization pulse (−VS): tell that a new frame is about to be displayed.

The Horizontal Synchronization pulse (−HS): tell that a new scan line is about to be displayed.

The Video Clock (VCLK): comprise system's pixel clock.

The Video Scan Clock (VSCLK): derived from VCLK. On every transition of VSCLK from 0 to 1, 12 bits of pixel data (VIDEO DATA OUT) is shifted out of the VIDEO BUFFER to the display via the digital analog ckt. D/A.

The Video Clock to D/A (VCLK'): derived from VCLK. On every transition of VCLK' from 0 to 1, 12 bit pixel data (VIDEO DATA OUT) is taken by the D/A converter.

The host computer initializes 3 registers.

1) Vertical Expand Pattern Register (VXPR) —Holds vertical expansion pattern
2) Horizontal Expand Pattern Register (HXPR) —Holds horizontal expansion pattern
3) Vertical Scan Line Register (VSLR) —Holds first scan line address of the VIDEO BUFFER to be displayed.

The function of the Vertical Expand Shift Register 12 (VXSR) is to vertically expand the displayed pattern by allowing a given horizontal line to be repeated. When −VS is 0, VXSR 12 is loaded with the contents of the Vertical Expand Pattern Register (VXPR) 10. On every transition of −HS from 0 to 1, VXSR is rotated (end-around shift) 1 bit. Whenever the least significant bit (VXSR<0>) is set, it signifies that the same scan line currently being displayed should be repeated. The operation of Vertical Scan Line Counter 14 (VSLC) is as follows. It is used as a pointer to specify which scan line of the VIDEO BUFFER is going to be displayed. When −VS is 0, this specifies that a new frame is about to be displayed, thus the first scan line address stored in the (VSLR) 16 of the VIDEO BUFFER is loaded into the VSLC. On every transition of −HS from 0 to 1, if VXSR <0> is set, then VSLC remains the same, (thus pointing to the same scan line) else VSLC is incremented. (Thus pointing to the next scan line) The operation of the Horizontal Expand Shift Register (HXSR) 20 is as follows. It is used to expand the video data line horizontally.

When −HS is 0, HXSR 20 is loaded from the Horizontal Expand Pattern Register 18 (HXPR). On every transition of VCLK from 0 to 1, HXSR is rotated (end-around shift) 1 bit. Whenever the least significant bit (HXSR<0>) is set, it signifies that the same pixel being displayed should be repeated.

The operation of the D-Q Flip Flop 22 is to delay the least significant bit of HXSR 20 (HXSR<0>) for 1 VCLK cycle. This in effect delays VCLK' 1 clock cycle from VSCLK (See FIG. 6).

The function of OR gates 24 and 26 is to deactivate VCLK' and VSCLK (See FIG. 6) e.g., if the flip-flop 22 is set VCLK' and VSCLK are inhibited.

Figure 6:
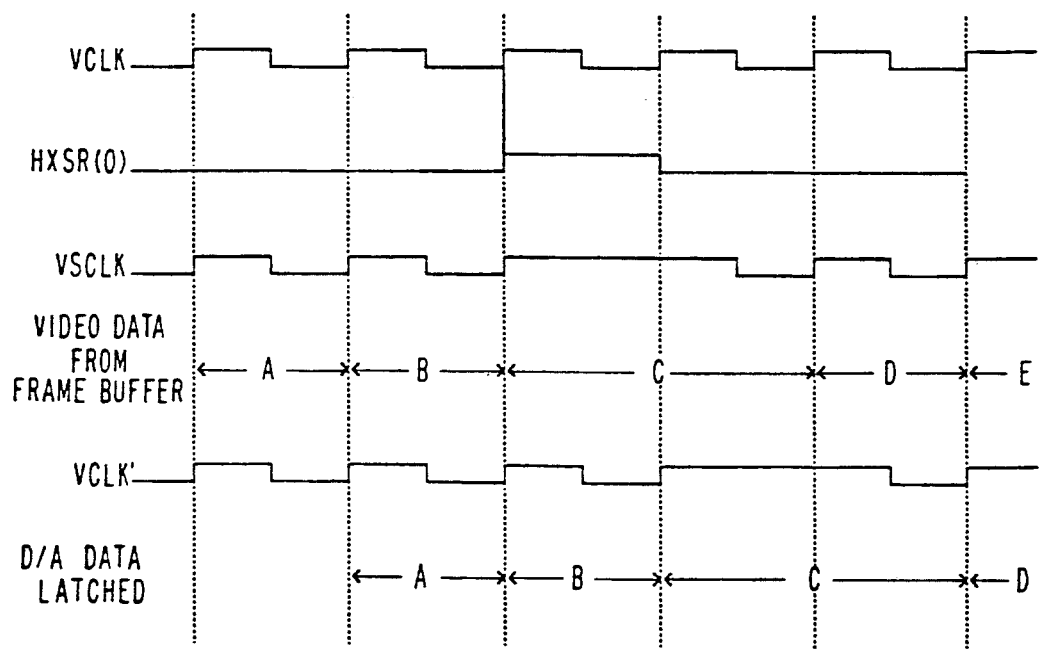
FIG. 6 comprises a timing diagram illustrating the operation of the expansion circuit of FIG. 5.

Referring now to FIG. 6, the overall timing of the system may be seen. VCLK is the free running system clock for the display. When HXSR<0> is 1, this suppresses VSCLK from going to 0 (Using OR gate 24). Since the scan clock to the VIDEO BUFFER is suppressed, the same VIDEO DATA OUT is available for 2 VCLK cycles (See the VIDEO DATA from the Frame Buffer curve on FIG. 6 whereby pixel "C" is repeated).

Using the flip-flop 22 and OR gate 26, VCLK' is delayed 1 VCLK cycle from VSCLK. Notice that this is necessary to ensure that the D/A device does not sample the VIDEO DATA OUT twice (pixel "C") (See FIG. 6). Unless VCLK' of the 4th clock cycle is suppressed, the "C" data would be latched twice by D/A device. This would cause an incorrect chrominance pattern.

It should be noted that the particular expansion pattern (rates) required can be easily provided by software in the host computer.

FIG. 4 shows 2:3 image expansion with a time multiplexing technique. Notice that luminance bits are simply replicated at every other pixel, but chrominance bits must be replicated by groups of four pixels to avoid losing chrominance data. An 8 bit expansion pattern for this would be 01010101.

The computation of the expansion patterns in both the horizontal and vertical directions would be obvious to those skilled in the art. The above example assumes a 2:3 expansion. By way of further example if a 8:10 (4:5) expansion were desired an 8 bit expansion pattern 00010001 would provide this. Thus every bit (line) having a "0" in the expansion field would be sent to the display once, whereas every bit (line) having a "1" in the expansion field will be repeated. An expansion pattern 00010000 would produce a 8:9 expansion.

For a description of a more generalized algorithm for computing the expansion pattern, reference may be made to referenced copending application Ser. No. 314,998 in the section entitled *A. Image Expansion*. It should be clearly understood that the method by which the expansion pattern is generated is not within the purview of the present invention.

CONCLUSION

The disclosure provides a solution to the real time color motion video image expansion with arbitrary zooming ratio, providing a single video window or equal expansion of several video windows, which are sampled within the same image frame buffer. The invention is especially important when a television image is sampled according to the standard digital television techniques. Furthermore, the invention solves the compatibility problem of overlaying previously taken video material with a variety of graphics controllers, each having different resolution and pixel video clocks.

By adding two registers, 2 shift registers, 1 flip-flop, and 2 OR gates it is possible to achieve the bi-directional image expansion of the present invention. As will be readily appreciated, the cost of doing this is either less than in a first category of prior art systems or is much more accurate than other prior art systems which, for example, change the video output clock frequency using analog means.

Thus, by utilizing the present invention, which operates on the output of the frame buffer, controls are provided which automatically cause specified pixels and lines in the video output to be repeated by controlling the serial port of the buffer "on the fly" without significantly increasing the buffer hardware and cost.

It should be noted that, as mentioned before, shift registers were chosen for use in the control circuitry for providing the expansion patterns for both horizontal and vertical directions. However, there is no reason why other obvious methods or instrumentalities cannot be used to provide these patterns. For example, two RAM's can be used to provide the patterns. One RAM would provide the pattern for the horizontal expansion and the other RAM would provide the pattern for the vertical expansion. These RAM's would be preloaded by the host computer with the expansion pattern.

It should be again noted that the means of providing the patterns is independent of the disclosure. Any method that provides two expansion patterns would work with the present invention as long as it adhered to the following rules:

1) A horizontal pattern bit is provided per pixel, and the same horizontal expansion pattern sequence is repeated on every scan line.
2) A vertical pattern bit is provided per scan line, and the same vertical expansion pattern sequence is repeated on every frame.

As clearly indicated above, many changes may be made in the circuits and processes specifically described herein without departing from the spirit and scope of the instant invention, and it is intended to encompass all other embodiments, alternatives, and modifications consistent with the invention.

We claim:

1. In a high-resolution display system including a high-resolution monitor, a computer including a frame buffer and means for generating timing and control signals for reading out video data stored in said frame buffer, in a digital luminance/chrominance (Y/C) X:1 format wherein the chrominance data fully representing the proper chrominance value for a plurality (X) of luminance pixels is time-multiplexed with related luminance pixels so each "m" bit chrominance data signal is split between m/x consecutive Y/C video signal packets, so that each luminance pixel field is associated with an m/x bit chrominance data field, a digital-to-analog converter (DAC) for connecting the digital video data to an analog format, for display on the monitor said signals including a pixel clock, a horizontal sync signal and a vertical sync signal and expansion pattern generating means which includes a specification of the scan lines which are to be repeated in a given frame and the pixels which are to be repeated in each scan line, the improvement which comprises a pixel presentation expansion mechanism located between the frame buffer output and the monitor input for altering the frame buffer access controls, including first means for causing selected adjacent scan lines to be repeated as they are read out of the frame buffer, and second means for causing the luminance data signal of the selected pixels in all the can lines of a particular frame to be repeated as they are read out of the frame buffer, and for maintaining the correct accessing of sequential time-multiplexed m/x bit chrominance data fields by the DAC to prevent the erroneous combination of chrominance data fields (C) accompanying repeated luminance data fields in the analog signal presented to the monitor.

2. A pixel representation expansion mechanism as set forth in claim 1, wherein said second means further includes means for inhibiting the transferring of chrominance bits to said digital to analog converter located between the output of the frame buffer and the input to the display monitor to prevent erroneous chrominance data from being decoded, combined with luminance data, and sent to the monitor when a particular pixel is repeated.

3. A pixel presentation expansion mechanism as set forth in claim 2, wherein both said first and second means include vertical and horizontal expansion register means for receiving and storing vertical (scan line) and horizontal (pixel) expansion patterns respectively generated by said computer and shift register means for receiving said respective expansion patterns and circuit means for successively examining each scan line and pixel expansion pattern to determine if a particular scan line or pixel is to be repeated and means for inhibiting scan line address generating circuit and pixel chrominance data, accessing circuitry respectively, if said scan line or pixel is to be repeated.

4. A pixel presentation expansion mechanism as set forth in claim 3, including means for periodically loading the vertical expansion register and loading the contents thereof into the vertical shift register once per frame in synchronism with the scan line frequency of the monitor and wherein the size of the expansion register and shift register is the same.

5. A pixel presentation expansion mechanism as set forth in claim 3, including means for periodically loading the horizontal expansion register and loading the contents thereof into the horizontal shift register once per scan line in synchronism with the pixel presentation frequency of the monitor and wherein the size of the expansion register and shift register is the same.

* * * * *